F. HACHMANN.
PISTON.
APPLICATION FILED DEC. 23, 1918.
1,353,041.
Patented Sept. 14, 1920.
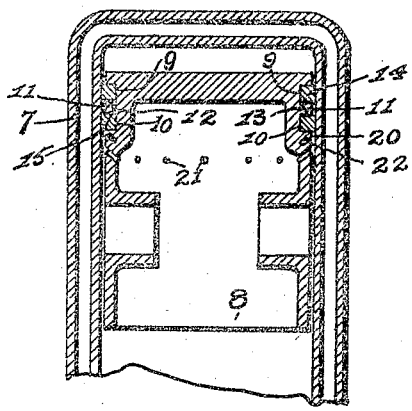
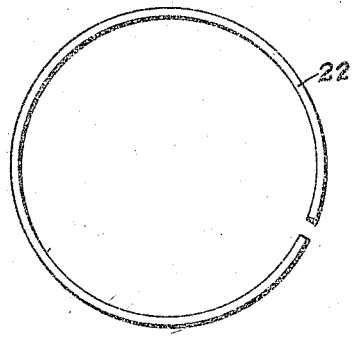
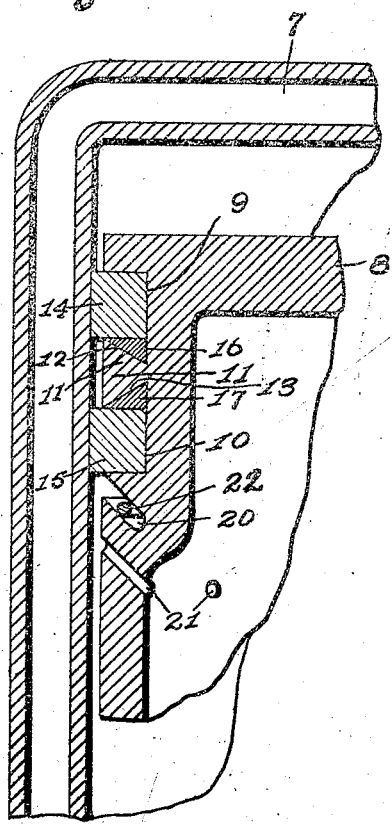
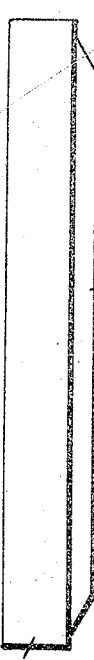
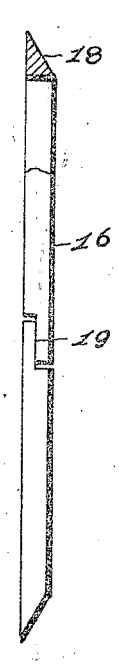
Inventor
Frederick Hachmann
by Edward E. Longan
Atty.

UNITED STATES PATENT OFFICE.

FREDERICK HACHMANN, OF ST. LOUIS, MISSOURI, ASSIGNOR OF ONE-HALF TO HERMAN STIFEL, OF ST. LOUIS, MISSOURI, ONE-SIXTEENTH TO PHILIP E. MOODY AND ONE-SIXTEENTH TO CHAUNCEY R. WATSON, BOTH OF DETROIT, MICHIGAN, ONE-EIGHTH TO DAVID M. HUTCHINSON, OF FERGUSON, MISSOURI, AND ONE-SIXTEENTH TO H. A. WRIGHT, OF DETROIT, MICHIGAN.

PISTON.

1,353,041.   Specification of Letters Patent.   Patented Sept. 14, 1920.

Application filed December 23, 1918. Serial No. 268,016.

*To all whom it may concern:*

Be it known that I, FREDERICK HACHMANN, a citizen of the United States, and resident of the city of St. Louis and State of Missouri, have invented certain new and useful Improvements in Pistons, of which the following is a specification containing a full, clear, and exact description, reference being had to accompanying drawings, forming a part thereof.

My invention relates to new and useful improvements in pistons and especially relates to pistons for internal combustion engines, the primary object of which is to construct a piston which will provide thorough and uniform lubrication and prevent the accumulation of carbon in and around the piston rings thereby maintaining the full efficiency of the piston rings.

A further object is to construct a piston wherein the piston rings are maintained in fluid tight contact with the side walls of the piston ring grooves.

In the drawings:

Figure 1 is a vertical sectional view of an engine cylinder, showing my piston in position.

Fig. 2 is an enlarged fragmental sectional view of a portion of an engine cylinder with the piston.

Fig. 3 is an enlarged edge view of the piston ring and forcing ring made use of, showing the same in their relative or operative positions.

Fig. 4 is a cross-sectional view of the piston ring.

Fig. 5 is an edge view of the forcing ring with parts broken away and in section.

Fig. 6 is a plan view of the oil distributing ring made use of.

Referring to the drawings, 7 indicates the cylinder of an ordinary internal combustion engine. 8 indicates my improved piston which is provided with piston ring channels or grooves 9 and 10, which are separated by the rib or flange 11. Formed on the rib or flange 11, adjacent the groove 9, is an under-cut recess or channel 12, and formed on the opposite side of the said rib, adjacent the groove 10, is an under-cut groove or recess 13. Both of these recesses or grooves are formed alike and converge inwardly from the periphery of the rib 11.

Mounted in the groove 9 is a piston ring 14, which may be of any desired construction, and mounted in the groove 10 is a similar ring 15. 16 and 17 indicate what might be termed forcing rings, which are constructed alike, and one located on each side of the rib 11 and between the rib and the adjacent piston ring. This forcing ring is provided with an inclined or beveled face 18, which is made to fit in the under-cut or flaring recess of the rib.

The forcing rings 16 and 17 are provided with a lap 19 of any desired and preferable construction. These rings are placed in their respective recesses under compression and the expansive force thereof will force the piston rings 14 and 15 tightly against the sides of the piston ring grooves so as to form fluid tight joints and prevent the accumulation of carbon around the piston rings.

In the present construction of pistons, it is well known that the accumulation of carbon around piston rings destroys the efficiency of the rings and in all forms of piston rings, heretofore constructed, there has been no provision made for forming a fluid tight joint between the sides of the piston ring and the sides of the grooves in which they are located.

In my improved construction, by virtue of the employment of the beveled forcing ring, the sides of the piston ring are forced against the side walls of the grooves, thus effecting a fluid tight joint without interfering with the expansive force of the piston rings proper, this being accomplished as can be readily observed by providing the forcing rings with beveled faces resting against an inclined face of the piston ring grooves in which the piston rings are seated.

In order to provide for thorough lubrication of the piston, I form in the same, a circular channel 20 which extends from the edge of the piston ring groove 10. This channel is cut at an angle as illustrated in Fig. 2 and below this channel I provide the piston with the usual oil ports 21.

In order to thoroughly distribute the oil which may accumulate in the oil channel 20, I employ an oil distributing ring 22 formed of brass or softer material than that out of which the cylinder or piston is formed. This ring in cross section is less than the width of the groove or channel 20, so as to permit the ring to have a slight movement within the groove by the operation of the piston.

As previously referred to, the essential feature of my improvement is to provide a fluid tight joint, between the sides of the piston rings and the grooves in which they are located, by means of a beveled faced forcing ring, and to provide in the piston, an oil channel with an oil distributing ring for a thorough and uniform lubrication of the piston.

In assembling the parts of my improvement, the forcing ring 16 and 17 are placed under compression in their respective recesses and then the piston rings are seated in their respective piston ring grooves and the tendency of the forcing rings to expand will force the piston rings against the sides of the piston ring grooves. When the piston rings have become worn, they can be replaced without changing the forcing rings.

Having fully described my invention, what I claim is:

In combination with a piston having a pair of parallel piston ring grooves near its upper end, said piston ring grooves having their adjacent ends undercut, of a split ring triangular in cross section sprung into the undercut portion of each groove, a split ring rectangular in cross section sprung in each groove adjacent the triangular ring, said last mentioned ring being larger in circumference than the triangular ring and the circumference of the piston, said triangular ring adapted to force the rectangular ring away from the undercut surface of the piston ring groove.

In testimony whereof, I have signed my name to this specification, in presence of two subscribing witnesses.

FREDERICK HACHMANN.

Witnesses:
EDWARD E. LONGAN,
ELIZABETH CARTALL.